United States Patent
Vezzu (10) Patent No.: US 8,728,402 B2
(45) Date of Patent: May 20, 2014

(54) OZONE GENERATOR

(75) Inventor: Guido Vezzu, Pfungen (CH)

(73) Assignee: Degremont SA, Rueil-Malmaison (FR)

(*) Notice: Subject to any disclaimer, the term of this patent is extended or adjusted under 35 U.S.C. 154(b) by 1404 days.

(21) Appl. No.: 11/913,129

(22) PCT Filed: May 22, 2006

(86) PCT No.: PCT/CH2006/000269
§ 371 (c)(1),
(2), (4) Date: Apr. 21, 2008

(87) PCT Pub. No.: WO2007/014474
PCT Pub. Date: Feb. 8, 2007

(65) Prior Publication Data
US 2008/0193343 A1    Aug. 14, 2008

(30) Foreign Application Priority Data

Aug. 3, 2005  (WO) ............... PCT/CH2005/000458

(51) Int. Cl.
*B01J 19/08* (2006.01)
(52) U.S. Cl.
USPC ............... 422/186.07; 422/186; 204/176
(58) Field of Classification Search
CPC  C01B 13/11; C01B 2201/22; C01B 2201/32; C01B 2201/14
USPC ............... 422/186.07, 186; 204/176
See application file for complete search history.

(56) References Cited

U.S. PATENT DOCUMENTS

| 4,886,645 | A | 12/1989 | Fischer et al. |
| 5,145,653 | A | 9/1992 | Fischer et al. |
| 5,211,919 | A | 5/1993 | Conrad |
| 7,514,377 | B2 * | 4/2009 | Sato et al. ............ 438/798 |

FOREIGN PATENT DOCUMENTS

| DE | 3220018 | 1/1993 |
| JP | 53-16386 | 2/1978 |
| JP | 58-28201 | 6/1983 |
| JP | 4-214004 A | 8/1992 |
| JP | 8-81205 | 3/1996 |
| SU | 1763357 | 9/1992 |

OTHER PUBLICATIONS

English translation of JP 53-016386.*
Third Party Observation for Japanese Patent Application No. 2008-524334 issued Mar. 29, 2012.
Notification of Reasons for Refusal for Japanese Patent Application No. 2008-524334 issued May 9, 2012.

* cited by examiner

*Primary Examiner* — Xiuyu Tai
(74) *Attorney, Agent, or Firm* — Marshall, Gerstein & Borun LLP (57) ABSTRACT

The invention relates to an ozone generator, comprising two electrodes and a dielectric layer arranged between the above such that between the dialectic layer and one of the electrodes an ozonizing gap is formed, through which an oxygen-containing gas can be run. In the direction of the flow of the gas, a dielectric capacity (CD) of the dielectric layer of the gas becomes smaller and/or layer thickness of the dielectric layer becomes greater, such that a gap width of the ozonizing gap is greater on the inlet side than the outlet side.

20 Claims, 4 Drawing Sheets

OZONE GENERATOR

REFERENCE TO RELATED APPLICATIONS

The application claims the priority of the international patent application PCT/CH2005/000458 which was filed on Aug. 3, 2005 and the contents of which are herewith included in this application.

BACKGROUND

The invention relates to an ozone generator comprising two electrodes and a dielectric layer arranged between them according to the preamble of claim 1.

PRIOR ART

An ozone generator is known from the patent DE 32 20 018 C2 which comprises two tubular electrodes and a dielectric layer arranged between them which are arranged such that a gap is formed between them serving as an ozonizing gap through which an oxygen-containing gas can be conveyed. The width of the gap of the ozonizing gap is smaller on the inlet side than on the outlet side. The capacity of the dielectric can become smaller in direction of flow of the oxygen-containing gas.

The object of the present invention is to create an ozone generator having good efficiency. That means, an ozone generator is to be created which generates a high quantity of ozone per energy applied.

This object is solved by an ozone generator having the features of claim 1.

In the ozone generator according to the invention, the two electrodes and the dielectric layer are arranged in such a way that an ozonizing gap is formed between the dielectric layer and one of the electrodes through which an oxygen-containing gas can be conveyed. A dielectric capacity of the dielectric layer becomes smaller in the direction of flow of the gas. Alternatively or in addition, the layer thickness of the dielectric layer can become greater. A gap width of the ozonizing gap is greater on the inlet side than on the outlet side. The gap width of the ozonizing gas preferably becomes continuously or discretely smaller in the direction of flow of the gas. Of course, the gap width can also become discretely smaller over a specific area and continuously smaller over another area. The discrete reduction of the ozonizing gap can, for example, take place by a step-like design of one or both electrodes.

With smaller ozone concentrations, the efficiency of the ozone generation is essentially not temperature dependent. On the other hand, with greater ozone concentrations, the efficiency deteriorates with increasing temperature. The supply of energy into the so-called discharge channels leads to local, momentary temperature excesses. These temperature excesses can be influenced by setting the power input in direction of flow of the oxygen-containing gas.

The power P absorbed by the ozone generator in kilowatts results from the following formula:

$$P = 4fC_D \frac{1}{1+\beta} U_{min}(U_{peak} - U_{min})$$

wherein $U_{peak}$ is the so-called peak voltage or the peak value of the voltage applied in volts, $U_{min}$ indicates the so-called ignition voltage or the minimum voltage from which, after it has been attained, the ozone generator is in a stable state and micro discharges take place over the entire half-cycle of the alternating voltage applied, f is the frequency of the voltage applied in hertz, $C_D$ is the dielectric capacity, $\beta$ the quotient $C_G/C_D$ and $C_G$ the gas gap or ozonizing gap capacity. In particular in the partial-load operation, it can occur that not the entire dielectric layer is active. This phenomenon can be taken into consideration by multiplying the aforementioned formula with a constant $\alpha$ which takes the surface coverage with micro discharges or the packing density of the micro discharges per surface of the dielectric layer into consideration. The effective coverage of the dielectric surface with respect to the number of micro discharges per unit area of the dielectric layer can be taken into consideration by the constant $\alpha$.

The quotient from the gas gap capacity and the dielectric capacity $C_g/C_d$ is also called damping. A high dielectric capacity or low damping leads to stronger, fewer micro discharges with a low surface coverage or packing density $\alpha$ of the micro discharges per dielectric surface. Lowering the dielectric capacity at a constant gas gap capacity leads to a higher damping $\beta$ and greater packing density $\alpha$ at a power output P which remains essentially the same. Accordingly, a reduction of the dielectric capacity leads to a reduction of the power absorbed by the ozone generator. The temperature in the ozonizing gap is dependent on the power, as already noted above, whereby the efficiency diminishes at high ozone concentrations, i.e. in particular on the outlet side of the ozone generator.

Therefore, to increase the efficiency, it is proposed that the dielectric capacity be reduced from the inlet side to the outlet side of the ozone generator. A corresponding effect can also be obtained by increasing the thickness of the dielectric layer from the inlet side to the outlet side. The efficiency of the ozone generator is improved if there is a higher power consumption on the inlet side than on the outlet side.

Furthermore, a gap width of the ozonizing gap decreasing toward the outlet can produce an increase in efficiency. Thus, the optimal gap width decreases with increasing ozone content of the gas. For example, at a gas pressure of 3.5 bar absolute, a cooling water temperature of 17° C., a power density of 3 kW/m² and a frequency of 975 hertz, the efficiency maximum for air with a low ozone content as gas (essentially 1% by weight) is at a gap width of a little more than 0.5 mm, while it is at a gap width of less than 0.4 mm for air with a high ozone content as gas (essentially 5% by weight). The same applies when pure oxygen is used as ozonizing gas. The (relative) ozonizing efficiency is thereby defined as the value k/E, wherein k is a given constant and E the electric energy required per kilogram ozone. In this respect, reference is made to the international application PCT/CH2005/000458, the contents of which are herewith included in this application. In this connection, reference is made, in particular, to the diagrams which show the efficiency of the ozone generation in dependency on the gap thickness or width for air or oxygen with varying ozone content and the pertinent parts of the description.

A further advantage of the decreasing gap width is that the cross-sectional area of the ozonizing gap decreases toward the outlet area. This leads to an increasingly higher flow velocity. Thus, the gas to be ozonized flows all the quicker the more ozone it contains. In this way, the effect of degradation processes on the ozone generation can be reduced. Degradation processes of this type result, for example, from flashbacks of ions from the surface of the electrodes which, in turn leads to a dust formation in the form of metal oxides. This effect is also called a sputtering effect. The dust formation leads to a dust covering of the electrode opposite the dielectric layer which, in turn, limits the ozonization gap capacity.

With a constant layer thickness or constant dielectric capacity, after the ozone generator has run in, the local weighting of the power absorption is too low or there is no local weighting of the power input, so that a substantial increase in efficiency cannot be obtained. By reducing according to the invention the dielectric capacity and/or increasing the layer thickness of the dielectric layer toward the outlet and reducing the gap width, the power absorption is locally weighted by the ozone generator. These steps, taken alone or in combination, advantageously lead to a stabilization of the power consumption and thus to a shortening of the intake time of the ozone generator.

To reduce the so-called sputtering effect, nitric oxide, in particular $N_2O_5$, is generally added to the gas to be ozonized. The nitric oxide leads to an additional emission of UV light which, in turn, leads to more unrestrained discharges, so that the voltage level of the operating voltage can be lowered. Furthermore, the nitric oxides include the metal oxides and in this way prevent the formation of dust. Thus, as a result of the nitric oxide, a passivation of the metal oxides deposited as dust on the surfaces of the electrodes takes place.

In the ozone generator according to the invention, a locally weighted power consumption takes place in that the gap width decreases toward the outlet and the dielectric capacity decreases in direction of flow of the gas and/or the layer thickness of the dielectric increases. Due to the locally weighted power consumption of the ozone generator, the effect of the surface of the electrodes decreases and the robustness of the ozone generator can be increased via the weighting of the power consumption. For example, the advantage of this is that less nitrogen or nitric oxide is required for the passivation of the metal oxides deposited on the surfaces of the electrodes. It can, for example, be sufficient to use nitrogen in an order of magnitude of 2000 ppm. Furthermore, the running-in period of the ozone generator can be reduced to less than 12 hours, whereas it is more than 500 hours in conventional ozone generators with a constant ozonization gap, constant dielectric capacity and constant layer thickness of the dielectric layer.

Even in non-ideal operating conditions, the ozone generator according to the invention behaves robustly and enables a problem-free or largely problem-free operation, also at ozone concentrations which can be above the ozone concentrations which are conventional in ozone generators with constant gap width, constant dielectric capacity and constant layer thickness of the dielectric layer. Non-ideal conditions comprise, for example, nitrogen deficiencies, pressure surges, ozone concentrations close to the poisoning limit, a high dew point or a high temperature of the condensation and/or increased traces of hydrocarbons in the gas to ozonized. A high dew point and the presence of traces of hydrocarbons in the gas to be ozonized lead to a wetting of the surfaces of the electrodes in the ozonizing gap. The result of this wetting of the electrodes is that the ozone generator begins to pulsate independently. The term "pulsating" refers to the occurrence of a series of recurrent, similar pulses or sparks. As there is a locally weighted power consumption in the ozone generator according to the invention, the effect of the pulsation on the efficiency can be reduced.

According to a preferred embodiment of the invention, individual series-connected sections are provided having a constant dielectric capacity in the respective section, wherein sections located downstream have the same or a smaller dielectric capacity than the sections located upstream. In addition or alternatively, individual series-connected sections can be provided which have a constant layer thickness of the dielectric layer in the respective section, wherein sections located downstream have the same or a greater layer thickness than the sections located upstream. Furthermore, in addition or alternatively, individual series-connected sections can be provided with the respective section having a constant gap width of the ozonizing gap, wherein sections located downstream have a smaller gap width than sections located upstream.

According to an especially preferred embodiment, the sections essentially have the same length and the ratio of sections with a first dielectric capacity to the sections with a second dielectric capacity, the second dielectric capacity being greater than the first dielectric capacity, is equal to the ratio of 1:3 in a total number of sections which can be divided by 4, and, in a total number of sections which can be divided by 3 and not by 4, equal to the ratio of 1:2. Alternatively or in addition, the ratio of sections having a first layer thickness to the sections having a second layer thickness which is greater than the first layer thickness can be 1:3 in a total number of sections divisible by 4 and 1:2 in a total number of sections that are divisible by 3 but not 4. Furthermore, alternatively or in addition, the ratio of sections with a first gap width to sections with a second, smaller gap width can be 1:3 in a total number of sections divisible by 4, and 1:2 in a total number of sections divisible by 3 but not by 4.

In an ozone generator which is divided into sections, the overall power consumed by the ozone generator is calculated according to the formula:

$$P = 4f \sum_{i=1}^{n} \alpha C_{D,i} \frac{1}{1+\beta_i} U_{min,i}(U_{peak} - U_{min,i}),$$

wherein the index i identifies the i-th section and n the total number of sections.

With a ratio of the sections of 1:2, by appropriate selection of the gap width and/or the dielectric capacity and/or the layer thickness of the dielectric layer of the first section can in relation to the corresponding sizes of the further sections it can be attained, that approximately ⅔ of the ozone concentration is already attained in the first section with about ⅓ of the energy required herefor. Thus, due to as high a power consumption in the first section as possible, a high ozone concentration is already obtained, e.g. ⅔ of the target concentration, while a reduced power consumption takes place in the two sections adjoining the first section in direction of flow by an appropriate selection of the dielectric capacity, in order to achieve the final target concentration.

The result of this is that higher temperatures occur just at ozone concentrations which are still relatively low, while the temperatures decrease with an increasing ozone concentration. This results in an increase in the efficiency of the ozone generator.

Alternatively or in addition to a variation of gap width, dielectric capacity and/or layer thickness of the dielectric layer, a locally weighted power consumption of the ozone generator can take place via the voltage supply and/or the electrode length. Thus, for example, a higher voltage can be fed into sections on the inlet side than into the sections on the outlet side or the peak voltage can decrease from the inlet side to the outlet side.

BRIEF DESCRIPTION OF THE DRAWINGS

Further advantageous embodiments of the invention are found in the dependent claims and in the embodiments described in the following with reference to the drawings, showing:

In the figures, the same reference signs refer to the components that structurally or functionally act the same.

METHODS FOR CARRYING OUT THE INVENTION

Figure 1:
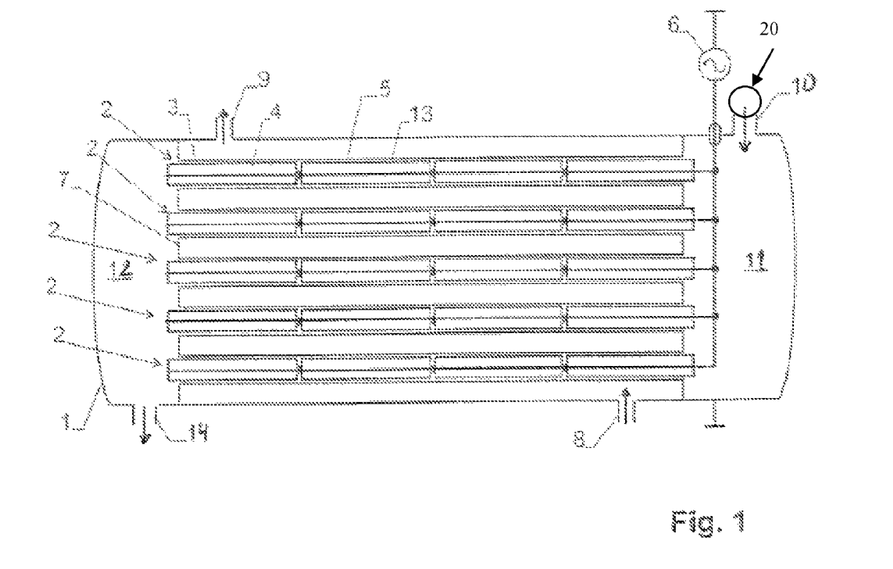
FIG. 1 a sectional illustration of an ozone generator.

In FIG. 1, an ozone generator is shown by way of example which comprises a housing 1 in which a number of essentially tubular electrode arrangements 2 is provided. Each electrode arrangement 2 has an inner electrode 3 and a tubular outer electrode 5 which is arranged concentrically about the inner electrode 3. The inner electrode 3 is arranged on several essentially cylindrical electrode supports 4 arranged behind one another seen in direction of flow of the gas. The inner electrodes 3 are connected with a high-voltage alternating-current source 6. The outer electrodes 5 are grounded. The gaps 7 between the electrode arrangements 2 are rinsed by cooling water which is supplied via an inlet line 8 and removed via an outlet line 9. The oxygen-containing gas to be ozonized, which can also be pure oxygen, is supplied from a supply 20 via an opening 10 into an inlet area or input area 11 of the ozone generator, from where it flows through the ozonizing gap 13 formed between the inner electrodes 3 and the outer electrodes 5 of the electrode arrangements 2. In the ozonizing gaps 13, the gas is ozonized by an electronic field generated by the electrodes 3 and 5, situated transversely to the ozonizing gaps 13, by a so-called still electric discharge. The ozonized gas enters into an outlet area or an output area 12 at the end of the electrode arrangements 2 and escapes from there through an outlet opening 14. The direction of flow of the gas is indicated by arrows not designated specifically. The direction of flow is also indicated by arrows in the further figures.

Figure 2:
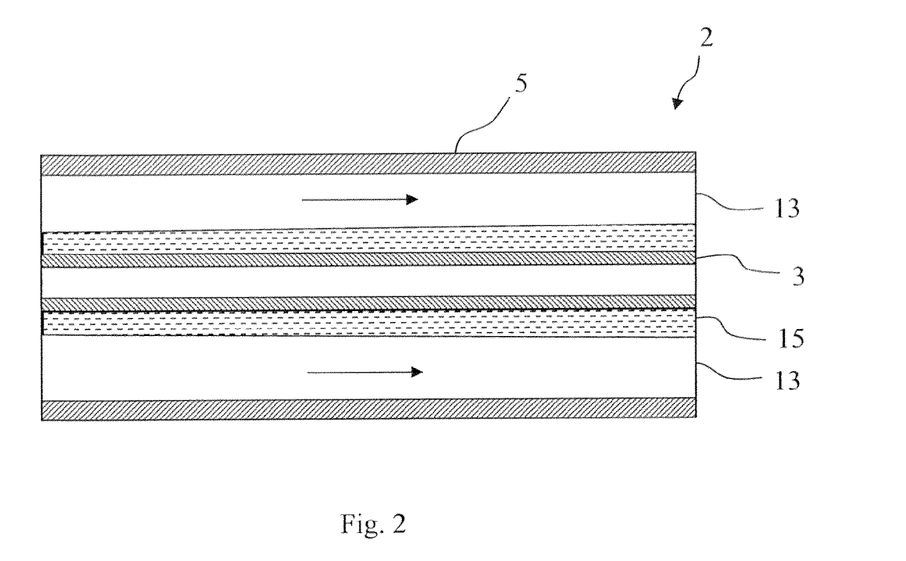
FIG. 2 a sectional illustration through a first embodiment of an electrode arrangement of an ozone generator according to the invention, FIG. 3 a sectional illustration through a second embodiment of an electrode arrangement of an ozone generator according to the invention, FIG. 4 a sectional illustration through a third embodiment of an electrode arrangement of an ozone generator according to the invention, and FIG. 5 a sectional illustration through a fourth embodiment of an electrode arrangement of an ozone generator according to the invention.

FIG. 2 shows a sectional illustration of a section of a first embodiment of an electrode arrangement 2. According to this first embodiment, the tubular outer electrode 5 has a constant inside diameter. The inner electrode 3, which is also tubular, has a constant external diameter. A dielectric layer 15 is situated on the inner electrode 3 in direction toward the outer electrode 5. The dielectric layer can also be provided at another position in the gap (not designated specifically) between the inner electrode 3 and the outer electrode 5. The layer thickness of the dielectric layer becomes greater on the outlet side. This can result in a reduction of the gap width of the ozonizing gap 13 (as shown). Instead of or in addition to the increase in the layer thickness of the dielectric layer 15, the dielectric capacity can decrease in direction of flow of the gas.

Figure 3:
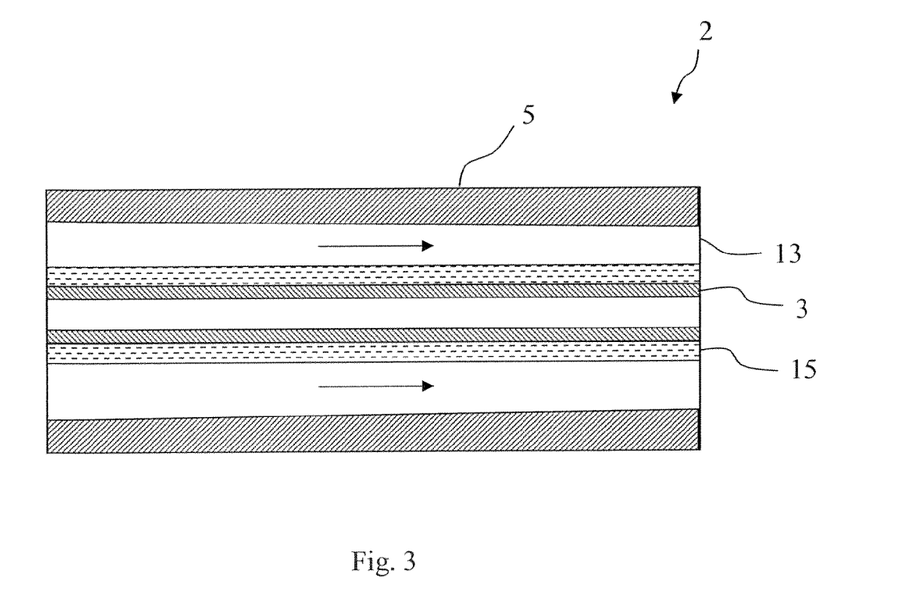

FIG. 3 shows a sectional illustration of a part of a second embodiment of an electrode arrangement 2 of an ozone generator according to the invention. According to the second embodiment, the inside diameter of the outer electrode decreases conically in direction of flow of the gas. Of course, designs are feasible in which the inside diameter decreases in another manner, for example, discretely by an inner surface of the outer electrode 5 in the form of steps. The inner electrode 3 has a constant external diameter. The dielectric layer 15 also has a constant external diameter. According to a further embodiment (not shown), the external diameter of the inner electrode 3 can, in addition or alternatively, increase in direction of flow.

The first and second embodiments shown in FIGS. 1 and 2 can be combined together, so that, for example, in the second embodiment, the layer thickness of the dielectric layer 15 increases in direction of flow and/or the dielectric capacity decreases in direction of flow.

Preferably, the dielectric capacity is on the inlet side 9 nanofarads (nF) or more than 9 nanofarads (nF), in particular 10.63 nanofarads (nF), and less than 9 nanofarads (nF), in particular 7.8 nanofarads (nF), on the outlet side. The gap width of the ozonizing gap is preferably more than 0.35 millimeters, in particular 0.38 millimeters, on the inlet side, and less than 0.35 millimeters, in particular 0.32 millimeters, on the outlet side. The dielectric capacity thus decreases in direction of flow preferably essentially by 2.83 nanofarads (nF), while the gap width of the ozonizing gap in direction of flow preferably decreases essentially by 0.06 millimeters. The ratio of gas gap capacity to dielectric capacity is preferably essentially 0.2 on the inlet side and preferably greater than 0.3 on the outlet side. By selecting the parameters dielectric capacity and gap width in this way, an especially good efficiency of the ozone generator is produced.

Figure 4:
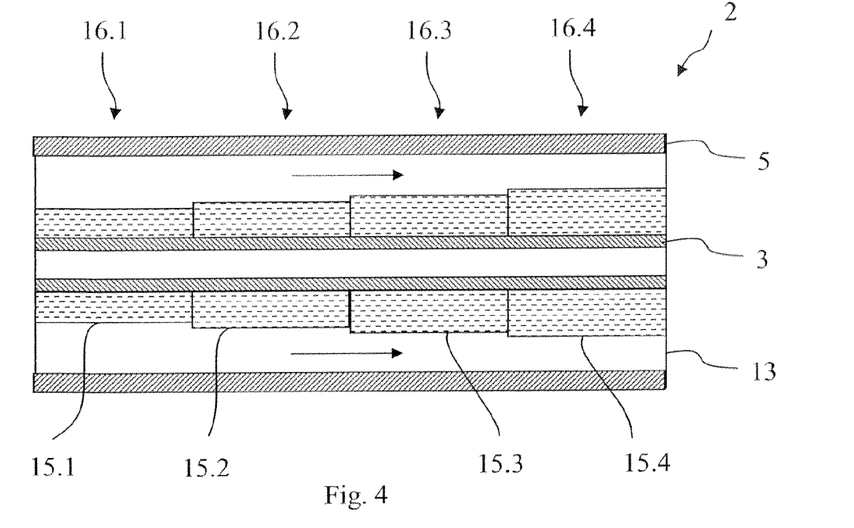

FIG. 4 shows a part of a third embodiment of an electrode arrangement 2, in which the outer electrode 5 has a constant inside diameter and the inner electrode 3 has a constant external diameter. However, the external diameter of the inner electrode 3 can increase in direction of flow. Similarly, the inside diameter of the outer electrode 5 can decrease in direction of flow. The electrode arrangement 2 is, for example, divided into four sections 16.1, 16.2, 16.3, 16.4, which are preferably of the same length, whereby the dielectric layers 15.1, 15.2, 15.3, 15.4 that are allocated to the respective sections 16.1, 16.2, 16.3, 16.4 each have a different layer thickness and/or a different dielectric capacity. The layer thickness of the dielectric layers 15.1, 15.2, 15.3, 15.4 preferably increases from section to section in direction of flow, which can result in a reduction of the gap width of the ozonizing gap 13. Alternatively or additionally, the dielectric capacities of the dielectric layers 15.1, 15.2, 15.3, 15.4 can decrease in direction of flow.

Especially preferred, the first section 16.1 has a gap width of 0.38 millimeters, the second section 16.2 a gap width of 0.36 millimeters, the third section 16.3 a gap width of 0.34 millimeters and the fourth gap a gap width of 0.32 millimeters. In the first section 16.1 the dielectric capacity is preferably 10.63 nanofarads (nF), in the second section 9.31 nanofarads (nF), in the third section 8.41 nanofarads (nF) and in the fourth section 7.80 nanofarads (nF). In this way, an especially high ozone generation can be obtained at low energy, i.e. an especially high efficiency can be obtained. Alternative designs are feasible. Thus, the dielectric capacities in sections 16.1, 16.2, 16.3, 16.4 can, in this sequence, also assume e.g. the following values: 15 nanofarads (nF), 11.3 nanofarads (nF), 9.2 nanofarads (nF), 7.8 nanofarads (nF) or 10.63 nanofarads (nF), 10.21 nanofarads (nF), 9.82 nanofarads (nF) and 9.46 nanofarads (nF).

In particular in the sections 16.3 and 16.4 on the outlet side, dielectric capacities and/or the layer thicknesses can advantageously be kept constant. Thus, the dielectric capacities for the sections 16.1, 16.2, 16.3, 16.4 can, in this sequence, also assume e.g. the following values: 10.63 nanofarads (nF), 8.41 nanofarads (nF), 7.8 nanofarads (nF) and 7.8 nanofarads (nF). An especially good efficiency can be obtained in this way.

Figure 5:
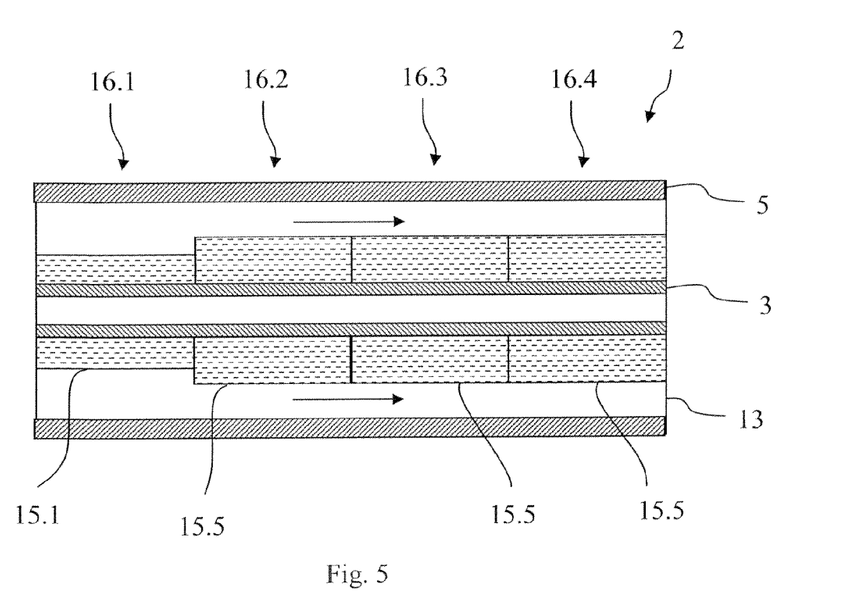

FIG. 5 shows a part of a fourth, especially preferred embodiment of an electrode arrangement 2 of an ozone generator according to the invention. For example, four sections 16.1, 16.2, 16.3, 16.4 are provided in which the layer thickness of the dielectric layer 15.1 of the first section 16.1 is less than the layer thickness of the dielectric layers 15.5 of the sections 16.2, 16.3, 16.4 adjoining the first section 16.1 in direction of flow. In addition or alternatively to a variation of the layer thickness, the dielectric capacity in the first section 16.1 can be greater than the dielectric capacity in the sections 16.2, 16.3, 16.4 in which they are advantageously constant. The gap width can be changed by decreasing the inside diameter of the outer electrode 5 and/or by increasing the external diameter of the inner electrode 3 in direction of flow. Thus, for example, in the transition from the first section 16.1 into the second section 16.2, the outer electrode 5 can narrow by means of a step and/or the inner electrode can expand by means of one step, whereby the gap width in sections 16.2, 16.3, 16.4 is constant and smaller than the gap width in the first section 16.1.

Thus, preferably, a power consumption divided into two takes place, whereby as much power as possible is absorbed in the first segment 16.1 and the power consumption on the remaining flow path in sections 16.2, 16.3, 16.4 is damped more. The power consumption in the first section 16.1 preferably takes place at a lower damping, for example, at a damping of about 0.2, whereas the damping in the sections 16.2, 16.3, 16.4 is preferably greater than 0.3. The damping is defined as the quotient of gas gap capacity and dielectric capacity.

If, as shown in FIG. 5, a total of four sections are provided, a section on the inlet side preferably has a high power consumption, while the sections adjoining the section on the inlet side have a lower power consumption. Thus, in FIG. 5, a section 16.1 with a high power consumption is shown and three sections 16.2, 16.3, 16.4 with a lower power consumption. Accordingly, two sections 16.1 with a high power consumption and six sections with a lower power consumption can be provided which adjoin the two sections 16.1 on the inlet side with high power consumption in direction of flow.

Figure 6:
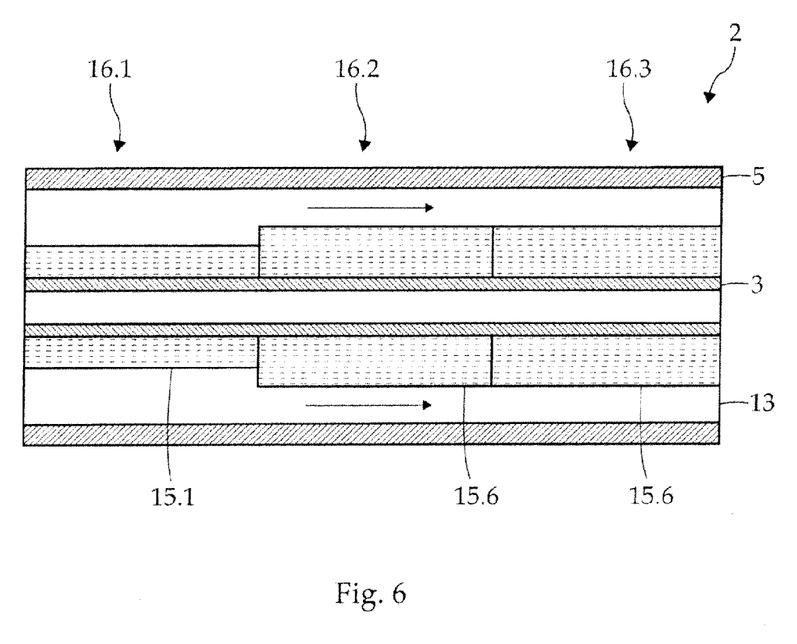
FIG. 6 a sectional illustration through another embodiment of an electrode arrangement of an ozone generator according to the invention.

If, as shown in FIG. 6, in total, only three sections are provided then the section on the inlet side preferably has a higher power consumption and the two sections adjoining it in the direction of flow have a low power consumption. For example, three sections 16.1, 16.2 and 16.3 are provided in which the layer thickness of the dielectric layer 15.1 of the first section 16.1 is less than the layer thickness of the dielectric layers 15.6 of the sections 16.2 and 16.3. If, in total, six sections are provided, then preferably the first two sections on the inlet side have a high power consumption and the four sections adjoining it, a lower power consumption.

If, in total, five sections are provided, then the section on the inlet side preferably has a high power consumption and the four sections adjoining it in direction of flow have a low power consumption.

Further allocations of sections and their power consumption in dependency on the total number of sections are feasible, whereby the ozone generator is preferably designed in such a way that at least 20 to 40% of the power consumption takes place on the first 15 to 35% of the overall length of the ozonizing gap 13 in direction of flow.

While preferred embodiments of the invention are described in the present application, it is herewith noted that the invention is not restricted to them and can also be designed differently within the scope of the following claims.

The invention claimed is:

1. An ozone generator comprising two electrodes and a dielectric layer arranged between them such that, between the dielectric layer and one of the electrodes, an ozonizing gap is formed having an inlet side and an outlet side through which an oxygen-containing gas is being conveyed, wherein, in the direction of flow of the gas, a dielectric capacity ($C_D$) of the dielectric layer becomes smaller and/or the layer thickness of the dielectric layer becomes greater, characterized in that a gap width of the ozonizing gap decreases in a stepwise manner in the direction of flow of the gas such that the gap width is greater on the inlet side than on the outlet side, and a supply is coupled to the inlet side for supplying the oxygen-containing gas to the ozonizing gap.

2. The ozone generator according to claim 1, characterized in that the two electrodes are configured as an inner electrode and as an outer electrode surrounding the inner electrode.

3. The ozone generator according to claim 2, characterized in that an inside diameter of the outer electrode decreased in the direction of flow.

4. The ozone generator according to claim 2, characterized in that an external diameter of the inner electrode increases in the direction of flow.

5. The ozone generator according to claim 1, characterized in that individual series-connected sections are provided which have a constant dielectric capacity ($C_D$) in the respective section, whereby sections located downstream with respect to the direction of flow have the same or a smaller dielectric capacity ($C_D$) than the sections located upstream with respect to the direction of flow.

6. The ozone generator according to claim 5, characterized in that individual series-connected sections are provided which have a constant layer thickness of the dielectric layer in the respective section, whereby sections located downstream with respect to the direction of flow have the same or a greater layer thickness than the sections located upstream with respect to the direction of flow.

7. The ozone generator according to claim 5, characterized in that individual series-connected sections are provided which have a constant gap width of the ozonizing gap in the respective section, whereby sections located downstream with respect to the direction of flow have a smaller gap width than the sections located upstream with respect to the direction of flow.

8. The ozone generator according to claim 5, characterized in that the dielectric capacity (CD) is 9 nF or more than 9 nFm on the inlet side, and less than 9 nF on the outlet side.

9. The ozone generator according to claim 1, characterized in that the gap width of the ozonizing gap is greater than 0.35 mm on the inlet side, and less than 0.35 mm on the outlet side.

10. The ozone generator according to claim 1, characterized in that the dielectric capacity ($C_D$) decreases essentially by 2.83 nF in the direction of flow of the gas.

11. The ozone generator according to claim 1, characterized in that the gap width of the ozonizing gap essentially decreases by 0.06 mm in direction of the flow of the gas.

12. The ozone generator according to claim 1, characterized in that the ratio of gas gap capacity ($C_G$) to the dielectric capacity ($C_D$) is essentially 0.2 on the inlet side and greater than 0.3 on the outlet side.

13. The ozone generator according to claim 5, characterized in that the sections have essentially the same length and that the ratio of sections with a first dielectric capacity to sections with a second dielectric capacity is 1 to 3 when a total number of sections is divisible by 4, and is 1 to 2 when the total number of sections is divisible by 3, and not by 4, whereby the second dielectric capacity is greater than the first dielectric capacity.

14. The ozone generator according to claim 5, characterized in that the sections have essentially the same length and that the ratio of sections with a first layer of thickness to sections with a second layer thickness is 1 to 3 when a total number of sections is divisible by 4, and is 1 to 2 when the total number of sections is divisible by 3, and not by 4, whereby the second layer is greater than the first layer thickness.

15. The ozone generator according to claim 6, characterized in that the sections have essentially the same length and that the ratio of sections with a first gap width to sections with a second gap width is 1 to 3 when a total number of sections is divisible by 4, and is 1 to 2 when the total number of sections is divisible by 3, and not by 4, whereby the second gap width is less than the first gap width.

16. The ozone generator according to claim 1, characterized in that the ozone generator is configured in such a way that at least 20 to 40% of the power consumption takes place on the first 15 to 35% of the overall length of the ozonizing gap in the direction of flow.

17. The ozone generator according to claim 5 characterized in that the dielectric capacity ($C_p$) is 10.63 nF on the inlet side and 7.8 nF on the outlet side.

18. The ozone generator according to claim 1 characterized in that the gap width of the ozone gap is greater than 0.38 mm on the inlet side and less than 0.32 mm on the outlet side.

19. The ozone generator of claim 1, wherein the dielectric layer becomes thicker toward the outlet side.

20. A method of ozonizing oxygen-containing gas, the method comprises:

flowing oxygen-containing gas from a supply coupled to an inlet side of an ozonizing gap to an outlet side of the ozonizing gap of an ozone generator, wherein the ozone generator comprises two electrodes and a dielectric layer arranged between them such that, between the dielectric layer and one of the electrodes, the ozonizing gap is formed from the inlet side to the outlet side through which the oxygen-containing gas is being conveyed, wherein, in the direction of flow of the oxygen-containing gas, a dielectric capacity of the dielectric layer becomes smaller and/or the layer thickness of the dielectric layer becomes greater, characterized in that a gap width of the ozonizing gap decreases in a stepwise manner in the direction of flow of the oxygen-containing gas such that the gap width is greater on the inlet side than on the outlet side.

\* \* \* \* \*

UNITED STATES PATENT AND TRADEMARK OFFICE
CERTIFICATE OF CORRECTION

PATENT NO. : 8,728,402 B2
APPLICATION NO. : 11/913129
DATED : May 20, 2014
INVENTOR(S) : Guido Vezzu

Page 1 of 1

It is certified that error appears in the above-identified patent and that said Letters Patent is hereby corrected as shown below:

In the Claims:

At Column 8, line 50, "(CD) is 9 nF or more than 9 nFm" should be -- ($C_D$) is 9 nF or more than 9 nF --.

Signed and Sealed this
First Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,728,402 B2  
APPLICATION NO. : 11/913129  
DATED : May 20, 2014  
INVENTOR(S) : Guido Vezzu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1482 days.

Signed and Sealed this

Twenty-ninth Day of September, 2015

Michelle K. Lee  
*Director of the United States Patent and Trademark Office*